United States Patent
Ito et al.

(10) Patent No.: US 6,689,178 B2
(45) Date of Patent: Feb. 10, 2004

(54) CERIUM BASED ABRASIVE MATERIAL AND METHOD FOR PRODUCING CERIUM BASED ABRASIVE MATERIAL

(75) Inventors: Terunori Ito, Tokyo (JP); Hidehiko Yamasaki, Tokyo (JP); Naoyoshi Mochizuki, Tokyo (JP); Yoshitsugu Uchino, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 12 days.

(21) Appl. No.: 10/111,405

(22) PCT Filed: Apr. 6, 2001

(86) PCT No.: PCT/JP01/02987
§ 371 (c)(1),
(2), (4) Date: May 6, 2002

(87) PCT Pub. No.: WO02/28979
PCT Pub. Date: Apr. 11, 2002

(65) Prior Publication Data
US 2003/0000150 A1 Jan. 2, 2003

(30) Foreign Application Priority Data
Oct. 2, 2000 (JP) .......... 2000-301624
Oct. 2, 2000 (JP) .......... 2000-301791

(51) Int. Cl.⁷ .............. C09K 3/14
(52) U.S. Cl. .......... 51/307; 51/309; 423/263
(58) Field of Search .......... 51/307, 308, 309; 106/3; 252/79.1; 423/263; 438/692, 693

(56) References Cited

U.S. PATENT DOCUMENTS

| | | | | |
|---|---|---|---|---|
| 5,543,126 A | * | 8/1996 | Ota et al. .......... | 423/263 |
| 5,772,780 A | | 6/1998 | Homma et al. | |
| 6,063,306 A | * | 5/2000 | Kaufman et al. .......... | 252/79.4 |
| 6,120,571 A | * | 9/2000 | Aihara et al. .......... | 51/309 |
| 6,372,003 B1 | * | 4/2002 | Kasai et al. .......... | 51/309 |
| 6,454,821 B1 | * | 9/2002 | Abbasi et al. .......... | 51/309 |
| 6,478,836 B1 | * | 11/2002 | Kido et al. .......... | 51/309 |

FOREIGN PATENT DOCUMENTS

| | | |
|---|---|---|
| EP | 939431 A1 | 9/1999 |
| GB | 2267389 A1 | 12/1993 |
| JP | 10-106987 A | 4/1998 |
| JP | 10-183103 A | 7/1998 |
| JP | 2000-160137 A | 6/2000 |
| JP | 2000-173955 A | 6/2000 |
| JP | 2000-273443 A | 10/2000 |
| WO | WO 00/37578 A1 | 6/2000 |

* cited by examiner

Primary Examiner—Michael Marcheschi
(74) Attorney, Agent, or Firm—Rothwell Figg Ernst & Manbeck

(57) ABSTRACT

Regarding a cerium oxide-based abrasive containing cerium oxide as a main component and abrasive particles with an average particle diameter of 0.2 to 3.0 μm, the present invention provides a cerium-based abrasive containing coarse particles of 10 μm or larger in a concentration of 1000 ppm or lower (by weight) or magnetic particles in a concentration of 1000 ppm or lower (by weight). The coarse particles or the magnetic particles are particularly preferable to exist in a concentration of 300 ppm or lower (by weight). Further, by controlling an average value of the specific surface area of the abrasive particles to be within 0.5 to 30 m²/g, the resulting abrasive is provided with a high cutting property and is capable of forming a polished face with high precision. The production method of such cerium-based abrasives comprises control being the concentration of the coarse particles and the classification point and repeated classification. The control of the magnetic particle concentration is made possible by utilization of a filter of a magnetic material and alteration of pulverization media, which are either solely or properly combined with each other to be performed.

19 Claims, 6 Drawing Sheets

CERIUM BASED ABRASIVE MATERIAL AND METHOD FOR PRODUCING CERIUM BASED ABRASIVE MATERIAL

TECHNICAL FIELD

The present invention relates to a cerium-based abrasive containing cerium oxide as a main component and excellent in polishing precision and cutting property as well.

BACKGROUND ART

Recently, a cerium-based abrasive containing cerium oxide ($CeO_2$) has been used for polishing a variety of glass materials. Especially, a cerium-based abrasive has been employed for polishing from conventional common plate glass materials to glass materials today to be used for electric and electronic apparatuses, for example, glass for magnetic recording media such as hard disks, glass substrates of liquid crystal displays (LCD) and its application field is widened.

The cerium-based abrasive is composed of abrasive particles containing cerium oxide ($CeO_2$) particles as a main component. The cerium-based abrasive can widely be classified into a high cerium abrasive and a low cerium abrasive depending on the content of cerium oxide. The high cerium abrasive contains at least 70% by weight of cerium oxide in relation to the whole amount of the rare earth oxides (hereinafter abbreviated as TREO) and is an abrasive containing a comparatively large amount of cerium oxide, whereas the low cerium abrasive is an abrasive containing cerium oxide in the content as relatively low as about 50% by weight in relation to TREO. Although the content of cerium oxide and the raw materials of these cerium-based abrasives are different, the production steps after raw material preparation are not so much different.

FIG. 1 shows the production steps of these cerium-based abrasives. The raw materials to be used for the high cerium abrasive are rare earth chlorides obtained by chemically treating and concentrating a rare earth ore so-called monazite. On the other hand, conventionally usually used as the raw materials of the low cerium abrasive is a bastnasite concentrate obtained by dressing the rare earth ore so-called bastnasite and recently, raw materials mainly used are derived from rare earth oxides or rare earth carbonates synthesized using the bastnasite ore and relatively economical complex ores produced in China. In the steps after raw material preparation, both are produced by chemically treating the raw materials (by the wet treatment), filtering, drying them, and further roasting them and pulverizing and sieving the obtained raw materials. The particle diameter of the abrasive particle constituting an abrasive is 0.2 to 3.0 $\mu$m on the bases of the average particle diameter, although depending on the purposes from the rough finishing to the final finishing, and it is controlled by adjusting the temperature in the foregoing production steps and the roasting step and adjusting the pulverization and the classification steps.

By the way, one reason why a cerium-based abrasive has widely been employed is that a large quantity of glass can be removed by abrasion within a relatively short time to obtain a high polishing value in addition to that a polished face with high precision can be obtained. In this case, regarding the polishing mechanism of the cerium-based abrasive, there are not necessarily any clear established theories, however, it is said that the fluorine component contained in an abrasive takes a significant role. That is, in addition to the mechanical polishing effect by cerium oxide, it is said that also the chemical polishing function is simultaneously caused as follows: the fluorine component contained in the abrasive reacts with the glass face to fluorinate the glass and accelerate corrosion of the glass surface. Therefore, regarding the cerium-based abrasive, it is supposed to be possible to exert the excellent polishing properties when both of the mechanical function and the chemical function are sufficiently performed.

As the first standard to produce an abrasive with excellent polishing properties, first of all, it is required for the abrasive to be free from abnormally grown abrasive particles and to have evenness in the particle diameter distribution. Therefore, in the production steps of the cerium-based abrasive, a variety of countermeasures are performed so as to suppress the abnormal particle growth of the abrasive particles. For example, in the chemical treatment steps, a raw material pulverized with a mineral acid such as hydrochloric acid, sulfuric acid, and the like is treated. That is for dissolving and removing alkali metals, e.g. sodium, and alkaline earth metals contained as impurities in the raw material with mineral acids since these alkali metals and alkaline earth metals cause the abnormal particle growth in the roasting step thereafter.

Further, in addition to the control in these production steps, regarding produced abrasives, product inspection is randomly performed to investigate the average particle diameter and the particle diameter distribution to investigate the existence of coarse particles owing to the abnormal particle growth.

Excellent abrasives have been supplied ever before through the above described control of the particle diameter distribution of abrasive particles in the production steps and the fluorine concentration and product inspection.

However, taking the demands for the cerium-based abrasive in the future into consideration, it is natural to be desired to develop further excellent abrasives. Especially, since further integration to a high density is required in an industrial field of a glass substrate for hard disks, LCD and the like and for that, it is required to obtain an abrasive which not only is capable of forming a polished face with extremely high precision but also has a high cutting property to carry out polishing to a prescribed extent at a high speed.

Hence, the present invention aims to provide a cerium-based abrasive capable of forming a polished face with precision higher than that a conventional method has ever achieved and having an excellent cutting property and a new standard and to provide a production method.

DISCLOSURE OF THE INVENTION

The inventors of the present invention have made investigation in details in polishing properties of conventional cerium-based abrasives and found a problem that scratches are sometimes formed in the polished face even in the case of using a conventional abrasive with a finely miniaturized average particle size and of which the particle diameter distribution is found no problem in a product inspection. Then, a variety of investigations into the causes of the occurrence of such scratches have been performed and consequently, the following two problems are found in the conventional abrasives which are regarded not to have any problem in the particle diameter distribution by the above described inspection method and thus the present invention is achieved.

The first problem in the conventional cerium-based abrasives is the existence of coarse particles in an extremely slight amount, which are inevitably contained by a conventional production method and which are impossible to be detected by a conventional inspection method. In this case, the coarse particles- in the present invention mean particles having a particle diameter several times as large as the average particle diameter of the abrasive particles composing an abrasive and having a particle diameter within a range in which they can not be detected by the particle diameter distribution by a conventional inspection method and within a range of 10 to 50 μm or more.

The inventors of the present invention have thought it is necessary to clarify the relation between the coarse particle concentration and the polished face even if the amount is extremely slight in order to obtain an abrasive with higher precision ever before. From such a viewpoint, the inventors of the present invention have enthusiastically investigated and consequently found that even if those found having no problem by a conventional inspection method contain coarse particles with a diameter of 10 μm or larger in 1,500 ppm or more by weight.

The inventors of the present invention have then found as a first invention that an abrasive can be provided corresponding to the applications by optimizing the coarse particle concentration according to the results of production of a variety of cerium-based abrasives with different coarse particle concentrations by production methods performed by variously modifying a conventional production method as described somewhere later and investigation of the frequency of the occurrence of the scratches in the polished face.

In other words, the first invention of the present application is a cerium oxide-based abrasive containing cerium oxide with an average particle diameter of 0.2 to 3.0 μm as a main component, wherein the cerium oxide-based abrasive contains coarse particles with a particle diameter of 10 μm or larger in a concentration of 1,000 ppm or lower by weight.

The cerium-based abrasive according to the first invention is one containing the coarse particles in a lowered concentration as compared with that of a conventional one and such an abrasive having 1,000 ppm or lower by weight concentration of the coarse particles of 10 μm or larger is suitable for polishing the glass face of a Braun tube and a CRT. By using such an abrasive, polishing the glass face of these products can provide a polished face with desired precision without forming scratches.

Further, according to the findings of the inventors of the present invention, it is confirmed that as the concentration of the coarse particles is lowered, the scratch formation can be suppressed more to obtain a polished face with desired precision. Especially, regarding the requirement for a polished face with extremely high precision for the finishing polishing of a glass substrate or the like for a hard disk and a LCD, today, a polished face scarcely having scratches has been required. It is therefore preferable to use an abrasive containing coarse particles with 10 μm or larger particle size in the concentration of 300 ppm by weight or lower in polishing at such high precision.

The second problem of a conventional cerium-based abrasive is the existence of the magnetic particles composed of magnetic metals of iron, nickel, and the like. Such magnetic particles are supposed to be contained in raw materials from the beginning or mixed during the production steps. Especially, in the production steps, contamination takes place supposedly attributable to the constituent materials of a wet pulverize, a drier, a roasting apparatus, a dry pulverize, and the like in the steps such as a wet pulverization step, a drying step, a roasting step, a dry pulverization step. The reason why the magnetic particles become causes of the occurrence of the scratches is supposed to be that the difference of the hardness between the magnetic particles (metal particles) and the abrasive (a metal oxide of such as cerium oxide) makes uniform polishing impossible.

The inventors of the present invention have made investigations of the relation between the content of the magnetic particles and the frequency of scratch occurrence based on the above described findings and have thought it is possible to obtain a highly precise cerium-based abrasive with no probability of causing scratches by defining the concentration of the magnetic particles within a prescribed range and achieved the second invention of the present application.

The second invention of the present application is a cerium oxide-based abrasive containing cerium oxide with an average particle diameter of 0.2 to 3.0 μm as a main component, wherein the cerium oxide-based abrasive contains magnetic particles in a concentration of 1,000 ppm or lower (by weight).

The cerium-based abrasive according to the second invention is wherein the content of the magnetic particles of a conventional cerium-based abrasive is lowered to suppress the concentration of the magnetic particles to 1,000 ppm or lower. The reason why the concentration of the magnetic particles is suppressed to 1,000 ppm or lower is because the concentration of the magnetic particles of a conventional cerium-based abrasive causing the scratches is found to be 1,500 ppm or higher by weight and the restriction is based on the consequent finding by investigations that the occurrence of scratches can reliably be suppressed to 1,000 ppm or lower.

The inventors of the present invention have confirmed that as the concentration of magnetic particles is lowered, the occurrence of the scratches is suppressed more to obtain the polished face with high precision. The abrasive containing magnetic particles in a concentration of 1,000 ppm or lower by weight is suitable, for example, for polishing glass face of a Braun tube and a CRT. On the other hand, regarding finishing polishing of a glass substrate or the like for a hard disk and a LCD, since extremely high precision of the polished face has today been required, the requirement can be satisfied by further decreasing the concentration of the magnetic particles and it is preferable to use those containing magnetic particles in a concentration of 300 ppm by weight or lower. Further, especially for a hard disk, if magnetic particles remain on the substrate surface after polishing, it causes a significant problem in magnetic recording and reproduction systems to result in deterioration of the reliability of the hard disk. Consequently, by using such an abrasive with a decreased concentration of magnetic particles of the present invention, the quality of a hard disk produced can be improved.

As described above, cerium-based abrasives according to the present invention contain coarse particles and magnetic particles in contents within respectively prescribed ranges, and these cerium-based abrasive can be said to be highly precise abrasives with no probability of causing scratches on the polished face.

Further, the inventors of the present invention have found a cerium-based abrasive having an excellent cutting property and capable of forming a polished face with high precision not only by controlling the concentration of the coarse particles and the concentration of the magnetic particles but also by controlling the specific surface area to within a range of 0.5 to 30 $m^2/g$.

If the specific surface area is smaller than 0.5 $m^2/g$, the abrasive particles become so large owing to excess proceeding of sintering that it is supposed scratches are caused at the time of polishing. Further, if the specific surface area is larger than 30 m²/g, the abrasive particles become so small owing to the insufficient degree of sintering that it is supposed the cutting property is too lowered.

As described above, a cerium-based abrasive comprising abrasive particles with a specific surface area within a prescribed range and having a decreased concentration of coarse particles and a decreased concentration of magnetic particles is capable of forming the polished face with high precision and taking an expected vast expansion of applications of a cerium-based abrasive in the future into consideration, it is necessary to stably produce a large quantity of the abrasive. The inventors of the present invention have reviewed the conventional production steps of a cerium-based abrasive and found that the concentration of coarse particles, the concentration of magnetic particles, and the specific surface area of the abrasive particles can easily be controlled by altering the production conditions. In this case, the conventional steps for producing a cerium-based abrasive can widely be divided into a step of forming a slurry by mixing an abrasive raw material and a dispersing medium, a step of pulverizing the abrasive raw material by treating the slurry by a wet pulverize, a step of roasting the abrasive raw material subjected to the pulverization after filtration and drying, and a step of again classifying the abrasive raw material after it is subjected to the roasting followed by repulverization.

A method for lowering the concentration of coarse particles, which is the first characteristic of the present invention, comprises the following two improvements in the classifying step.

The first improvement is to lower the concentration of the coarse particles by setting the classifying point to 0.5 to 15 $\mu$m. In this case, the classifying point denotes the particle diameter to be a boundary of particles to be separated by a classifying apparatus and it generally means the particle diameter value at which the partial classification efficiency (the particle amount in the separated fine particle side to the particle amount before the classification) becomes 50%. The classifying point is generally corresponding to the operation conditions (e.g. the air delivery, the rotation speed, and the like in the case of a wind type classifying apparatus) and in the present invention, the classification point is fixed to carry out the classification treatment by setting the operation conditions of the classifying apparatus. The reason why the range of the classification point is set from 0.5 to 15 $\mu$m is that in the case of 15 $\mu$m or larger, the concentration of coarse particles cannot be lowered and on the other hand that even in the case of setting the classification point to be 0.5 $\mu$m or smaller, it becomes difficult to set the operation conditions of the classifying apparatus corresponding to the setting. Further, taking the production efficiency of an abrasive into consideration, the classification point especially preferable is within a range from 1 to 10 $\mu$m.

Incidentally, the classification treatment involving such alteration of classification point does not restrict the models of classifying apparatuses. Consequently, the treatment is made possible by any types of apparatuses, e.g. so-called a dry classifying apparatus such as a wind type classifying apparatus and so-called a wet type apparatus such as a liquid cyclone.

The second method for lowering the concentration of coarse particles is that re-classification of an abrasive after classification is carried out at least once. That is based on the consideration that there is possibility of occurrence of contamination of coarse particles with the size equal to or larger than the classification point in the abrasive by only once classification even if the classification point is limited. By carrying out re-classification, the concentration of the coarse particles in the abrasive can be lowered. The number of times to repeat the re-classification is sufficient to be about once taking the production efficiency of the abrasive into consideration. Incidentally, the re-classification is preferable to be carried out in combination with the above described control of classification point, that is, the classification point is restricted within a range of 0.5 to 15 $\mu$m. Consequently, it is made easy to produce an abrasive having the concentration of coarse particles in 300 ppm or lower and possible to be used for finishing polishing. Incidentally, the classification point at the time of re-classification in that case may be set at the same value of the classification point at the time-of first classification.

On the other hand, as a method for lowering the concentration of magnetic particles, the following three are available. A first technique to lower the magnetic particles of an abrasive comprises a step of passing a slurry treated by a wet type pulverize through a magnetic material magnetized by excitation. The reason for the removal of magnetic particles from an abrasive raw material in the slurry state is because if being in the slurry state, the particles are scarcely agglomerated and the magnetic particles are made easy to move by the magnetic field, so that the magnetic particles can efficiently be collected more practically, magnets are arranged in the circumference of a filter and the magnets are excited to apply a magnetic field to the filter part to magnetize the filter and then a slurry of the abrasive material is passed through the filter. In this case, electromagnets are preferable to be employed as the magnets to magnetize the magnetic filter and the intensity of the magnetic field to be generated is preferable to be within a range from 0.1 to 2.0 T magnetic flux density. In the case of 0.1 T or lower, small magnetic particles cannot be collected, whereas in the case of 2.0 T or higher, the operation cost of the magnets is increased and additionally it becomes difficult to remove the attracted magnetic particles adhering to the filter at the time of maintenance to result in decrease of the productivity. The number of the times to repeat the filtration of the abrasive slurry is not particularly restricted, however by setting the number to be a plurality of times, the concentration of the magnetic particles can further be decreased.

Incidentally, the models of a wet type pulverize to be employed in this case are not particularly restricted, however, applicable are, for example, a wet type ball mill, a bead mill, an attriter and the like. Further, at the time of carrying out wet pulverization of the abrasive raw material, it is necessary to make the abrasive raw material be a slurry by mixing it with a dispersing medium, and procedure at the time includes a case carrying out the steps of previously mixing the abrasive raw material with a dispersing medium to produce a slurry and then pulverized by loading a wet type pulverize with the slurry and besides the case, also includes a case of carrying out the steps of loading a wet type pulverize with an abrasive raw material and a dispersing medium to start pulverization and make the abrasive raw material be a slurry at the initial period of the pulverization. These cases are similarly applicable for the following production methods.

As a second technique to lower the magnetic particles of an abrasive includes steps of pulverizing the abrasive raw material using a pulverization medium made of a non-magnetic material with which a wet type pulverize is filled to pulverize a slurry to be pulverized. The pulverization medium is an object which moves interlockingly with the movement (rotation, vibration) of the pulverize while being packed in the pulverize and consequently performs pulverization function and ball-like ones are used for the above described wet type ball mill or the like. The material to be used for the medium is generally iron or a wear resistant steel in consideration of the cost and the pulverization efficiency.

In this case, as described above that the cause of the contamination of the abrasive with magnetic particles is attributed to the raw material pulverization step among the production steps, that is supposedly attributed to that wear or pulverization of the pulverization medium is caused during the pulverization step and it becomes one of causes of contamination with magnetic particles. The second method aims to inhibit generation of magnetic particles by using a non-magnetic material for the material of the pulverization medium and consequently to lower the concentration of magnetic particles in the abrasive. Hence, taking the intrinsic function of pulverizing a raw material into consideration, it is preferable to use a non-magnetic and hard material such as zirconia or alumina for the constituent material of the pulverization medium. Incidentally, in the case where a non-magnetic material for the pulverization medium, it is preferable to use a hard non-magnetic material for the inner parts of a pulverizer and the inner faces of pipes and tubes to be brought into contact with the slurry in the pulverize.

As a third technique to decrease the magnetic particles in an abrasive, an abrasive raw material after roasting is passed through the peripheral part of a tubular body, a plate-like body, and a rod-like body made of a magnetized magnetic material. Among the abrasive production steps, the step is the treatment for the abrasive material in form of almost the final product shape in terms of the composition after the roasting and pulverization steps and before classifying step and the dry treatment in contrast with the treatment for the slurry state. The third method is effective to remove mixed magnetic particles derived from the constituent materials of the roasting furnace or the pulverize in the roasting step or the pulverization step after the roasting. Incidentally, the dry type magnetic particle removal step is a treatment for the abrasive raw material after the roasting and may be carried out after dry type pulverization immediately after the roasting or before the classification treatment and may be carried out at any timing after the dry pulverization or after the classification treatment. Further, a practical embodiment of the method includes that the abrasive raw material after the roasting is passed through the inside of a tubular body or a box body magnetized by excitation, that the abrasive raw material is brought into contact with magnets arranged in a transportation passage for the abrasive raw material after the roasting, and that the abrasive raw material is passed between two magnetized metal plates or metal rods. Further, the magnetic flux density of a magnetic material to be magnetized is preferably within a range from 0.1 to 2.0 T according to the same reason as already described in the case of the magnetic filter.

By the above described three methods for decreasing the magnetic particle concentration, magnetic particles can efficiently be removed without requiring additional installation of large scale facilities and a cerium-based abrasive with a high quality can be produced at a low cost. Although the magnetic particle removal treatments are of course effective even if the respective treatments are carried out separately, the concentration of magnetic particles can further efficiently be decreased by combining two or all three methods.

Hence, regarding a cerium-based abrasive as described above, a cerium-based abrasive capable of forming a polished face with a precision and having excellent cutting property can be obtained not only by controlling the concentration of coarse particles and the concentration of magnetic particles but also by controlling the specific surface area to be within a range from 0.5 to 30 $m^2/g$. As described above, in order to keep the specific surface area of an abrasive within the above described range, it is important to control the sintering conditions. Although depending on the sintering method and the particle diameter of the abrasive raw material before the sintering, the sintering conditions are preferably controlled to be 600 to 1100° C. of sintering temperature and 1 to 60 hours of sintering duration.

Incidentally, in the above described production method of the cerium-based abrasive, it is required to disperse a raw material in a dispersion medium at the time of wet pulverization of the raw material, an organic solvent may be usable for the dispersing medium, however those containing mainly water are preferable. Further, the dispersion medium is preferable to be properly mixed with a dispersant, a pH adjusting agent and the like.

Further, in a cerium-based abrasive of the present invention with decreased coarse particles or magnetic particles, fluorine is properly added at the time of production if necessary to carry out chemical treatment.

BRIEF DESCRIPTION OF THE DRAWINGS

Further.

BEST MODE FOR CARRYING OUT THE INVENTION

Hereinafter, together with comparative examples, preferable examples of the present invention will be described.

A. The Relation Between the Coarse Particle Concentration and the Polishing Property First Embodiment A slurry containing a powder with the average particle diameter of 0.9 $\mu$m (cumulative 50% particle diameter by micro-track method D50) was produced by pulverizing, for 5 hours, 2 kg of bastnasite concentrate containing 70% by weight of TREO and 50% by weight of cerium oxide contained in TREO in the presence of 2 liters of pure water with the use of a wet type ball mill (the capacity of 5 l) housing 12 kg of 5 mm-diameter steel balls. The powder was treated with hydrochloric acid at a concentration of 1 mol/l and then washed with pure water and filtered to obtain a cake. After that, the cake was dried and roasted at 950° C. for 5 hours in a stationary furnace and after re-pulverized, the resulting powder was classified to obtain a cerium-based abrasive.

In the classifying step, classifying treatment was carried out once using a dry type vertical wind classifying apparatus (trade name YM Micro Cut: manufactured by Yasukawa Electric Co., Ltd.) as a classifying apparatus and setting the classification point at 7 µm.

Figure 1:
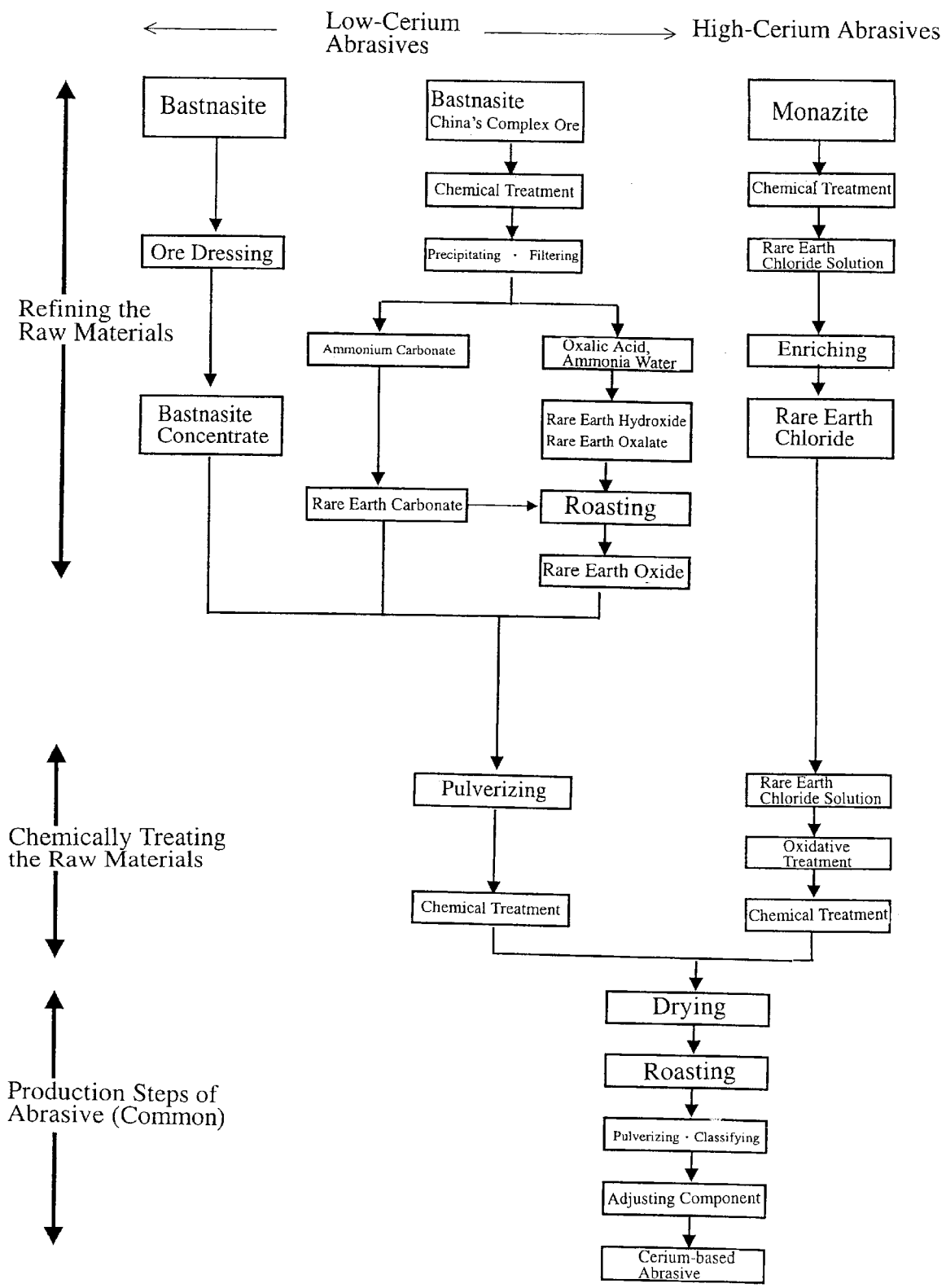
FIG. 1 shows a diagram illustrating the production steps of a conventional cerium-based abrasive.
Figure 2:
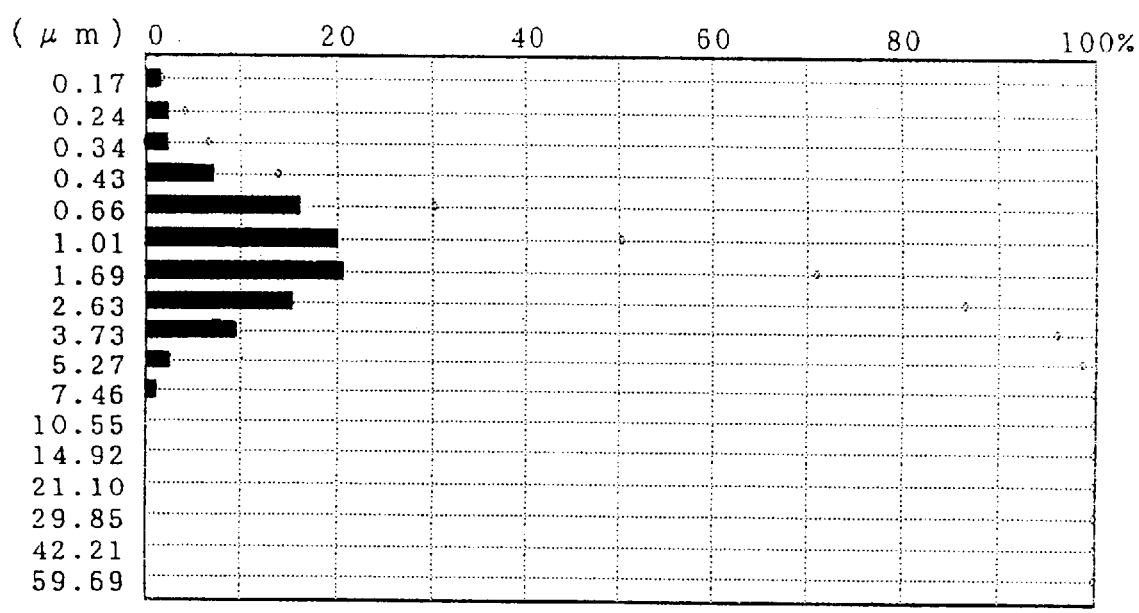
FIG. 2 shows a graph illustrating the particle diameter distribution of a cerium-based abrasive relevant to First Embodiment measured by laser diffraction method.

Regarding the abrasive produced in such a manner was subjected to investigations of the average particle diameter and the particle diameter distribution by a laser diffraction method, which is a conventional inspection method, to find the abrasive having the average diameter of 0.9 µm (cumulative 50% particle diameter by micro-track method D50) and the particle diameter distribution shown as FIG. 2. According to the particle size distribution, no particles with 10 µm or higher were detected.

Figure 3:
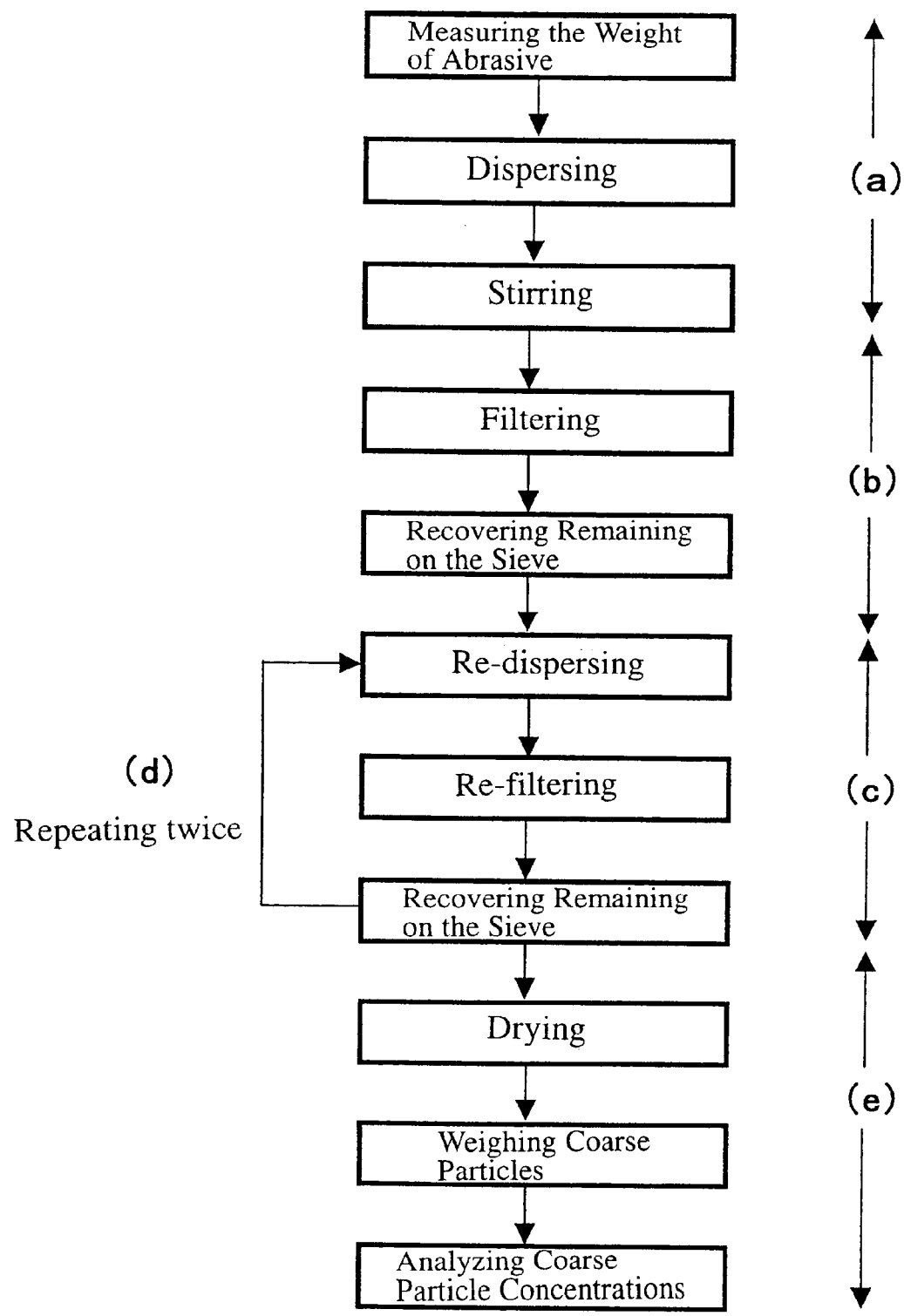
FIG. 3 is a diagram illustrating the coarse particle concentration analysis relevant to the embodiment and FIG. 4 is a diagram illustrating the magnetic particle concentration analysis relevant to the embodiment.

In order to quantify the coarse particle concentration of the abrasive, analysis of the coarse particle concentration was carried out by the steps shown in FIG. 3. The analysis method of the coarse particle concentration will be described along with FIG. 3.

(a) At first, 200 g of a cerium-based abrasive was measured and sampled and dispersed in a 0.1% sodium hexametaphosphate solution and stirred for 2 minutes to obtain a slurry.

(b) Next, the slurry was filtered through a micro sieve with a pore diameter of 10 µm and the remaining on the sieve was recovered.

(c) Then, the recovered remaining was dispersed again in a 0.1% sodium hexametaphosphate solution to obtain a slurry. At that time, dispersion was carried out by ultrasonic stirring for 1 minute. The slurry was then filtered through a micro sieve with pore diameter of 10 µm.

(d) Further, the recovery of the remaining, the repeated production of the slurry, and filtration were carried out twice in the present embodiment.

(e) Finally, the recovered coarse particles were sufficiently dried and then weighed.

Based on the analysis results of the coarse particle concentration, 200 mg of coarse particles were sampled from the cerium-based abrasive produced in this embodiment and the coarse particle concentration was found to be 1000 ppm (by weight). Consequently, the cerium-based abrasive produced in the present embodiment was found containing coarse particles even though their content was as slight as 1000 ppm, although coarse particles with 10 µm or large size were not detected by a laser diffraction method, which is conventionally commonly employed.

Next, the specific surface area of abrasive particles of the cerium-based abrasive produced in the present embodiment was measured. The specific surface area was measured as follows. A sufficiently dried sample (an abrasive) in about 0.5 g was weighed and the surface area was measured with a surface area measurement apparatus (a full-automatic surface area measurement apparatus; Multisorp 12: manufactured by Yuasa Ionics Co., Ltd.). The measurement conditions were as follows: after the testing apparatus was evacuated and using a gas mixture of nitrogen and helium as an adsorption gas, the relative pressure was set 0.3 and the entire surface area of the sample was measured by a BET single point method and the specific surface area was calculated from the sample weight.

Second to Eighth Embodiments

Next, cerium-based abrasives with different coarse particles concentrations were produced with the classification points and the number of the classification times as shown in Table 1 changed while the production conditions of the raw material compositions and the roasting temperature and the like being kept as same as those in First Embodiment and the coarse particle concentrations were analyzed. In Table 1, the term, drying type, means those subjected to classification by the same vertical wind classifying apparatus as that of First Embodiment and the term, wet type, means those subjected to classification by making the powders after cake pulverization be 5% by weight of slurries and classifying the slurries by a liquid cyclone.

Ninth Embodiment

In this embodiment, the raw material used was same as those used for First to Eighth Embodiments and the roasting conditions in the roasting step were set to be 1,000° C. and 5 hours. Other production conditions were made same as those of First to Eighth Embodiments. The classifying conditions were controlled to be same as those of Third Embodiment.

Tenth Embodiment

In this embodiment, the raw material used was same as those used for First to Eighth Embodiments and the roasting conditions in the roasting step were set to be 800° C. and 5 hours. Other production conditions were made same as those of First to Eighth Embodiments. The classifying condition was controlled as to carry out classification once at 10 µm classification point.

Eleventh Embodiment

In this embodiment, the raw material used was same as those used for First to Eighth Embodiments and the roasting conditions in the roasting step were set to be 700° C. and 5 hours. Other production conditions were made same as those of First to Eighth Embodiments. The classifying condition was controlled as to carry out classification once at 7 µm classification point.

Twelfth Embodiment

In this embodiment, the raw material used was same as those used for First to Eighth Embodiments and the roasting conditions in the roasting step were set to be 1,100° C. and 10 hours. Other production conditions were made same as those of First to Eighth Embodiments. The classifying condition was controlled as to carry out classification twice at 7 µm classification point.

Thirteenth Embodiment

In this embodiment, the raw material used was same as those used for First to Eighth Embodiments and the roasting conditions in the roasting step were set to be 550° C. and 10 hours. Other production conditions were made same as those of First to Eighth Embodiments. The classifying condition was controlled as to carry out classification once at 7 µm classification point.

Fourteenth Embodiment

In this embodiment, an abrasive was produced by using a rare earth oxide as an abrasive raw material in place of the bastnasite concentrate and adding a fluorine component by carrying out treatment with ammonium fluoride. A slurry containing 2 kg of the rare earth oxide containing 99% by weight of TREO which was produced by roasting rare earth carbonates, the TREO containing 60% by weight of cerium oxide, was mixed with 2 l of pure water. The resultant slurry was pulverized for 5 hours with the use of a wet type ball mill (the capacity of 5 l) housing 12 kg of 5 mm-diameter steel balls to obtain a slurry containing a powder with the-average particle diameter of 0.9 µm (cumulative 50% particle diameter by micro-track method D50). An ammonium fluoride solution of 1 mol/l concentration was added to the slurry and after washing with pure water, the resulting slurry was filtered to obtain a cake. After that, the cake was dried and then roasted at 950° C. for 5 hours and after re-pulverized, the resulting powder was classified to obtain a cerium-based abrasive.

In this case, in the classifying step, classifying treatment was carried out twice using the same dry type vertical wind classifying apparatus as that employed for First Embodiment while the classification point being set at 7 μm.

Fifteenth Embodiment

In this embodiment, using cerium oxide (99%) produced from Paotau, China as an abrasive raw material, an abrasive was produced by carrying out treatment with ammonium fluoride in the same manner as Ninth Embodiment. While the mixing amounts of the raw material and water and the pulverization conditions are controlled to be same as those in Ninth Embodiment, the wet pulverization was carried out to obtain a slurry containing a powder with the average particle diameter of 1.4 μm (cumulative 50% particle diameter by micro-track method D50). Then, after fluoridation treatment and drying were carried out in the same manner as those of Ninth Embodiment, roasting, pulverizing, and classifying steps were carried out to obtain a cerium-based abrasive.

In this case, in the classifying step, classifying treatment was carried out twice using the same dry type vertical wind classifying apparatus as that employed for First Embodiment while the classification point being set at 7 μm.

These abrasives produced in Second to Twelfth Embodiments were found to contain no coarse particle with the size of 10 μm or larger by the particle size distribution inspection by laser beam diffraction just the same as First Embodiment, but existence of coarse particles in 150 to 1,000 ppm (by weight) was found under the coarse particle concentration analysis in the above described First Embodiment. The measurement results of these coarse particle concentration are shown in Table 1. As a result, the coarse particle concentrations were found decreasing by making the classification point small and increasing the number of times of classification. Further, no difference was found in the effect to decrease the coarse particles concentrations depending on the models; either dry way or wet way; of classifying apparatuses. Incidentally, Table 1 shows the measurement values of specific surface area together.

Comparative Example 1

In this comparative example, a cerium-based abrasive was produced in the same production method as Third Embodiment except that the classification point was set to be 20 μm and its coarse particle concentration was analyzed.

Comparative Example 2

In this comparative example, the same raw material as that used in First to Eighth Embodiments was used and the roasting conditions were set to be 1,100° C. and 10 hours. Other conditions were same as those in First to Eighth Embodiments. Further, classification point and the number of repeated classification times were respectively set to be 18 μm and twice.

Comparative Example 3

In this comparative example, the same raw material as that used in First to Eighth Embodiments was used and the roasting conditions were set to be 550° C. and 10 hours. Other conditions were same as those in First to Eighth Embodiments. Further, classification point and the number of repeated classification times were respectively set to be 30 μm and once.

Comparative Example 4

In this comparative example, the same raw material as that used in First to Eighth Embodiments was used and the roasting conditions were set to be 1,200° C. and 10 hours. Other conditions were same as those in First to Eighth Embodiments. Further, classification point and the number of repeated classification times were respectively set to be 16 μm and twice.

Also in these abrasives by the comparative examples, no existence of coarse particles of 10 μm or larger was found just like First to Twelfth Embodiments by the particle distribution inspection by the laser beam diffraction, however, existence of coarse particles in 1,500 ppm (by

TABLE 1

| | Classification type | Classification point (μm) | Times of classification | Coarse particle concentration (ppm) | Specific surface area (m²/g) |
|---|---|---|---|---|---|
| Second Embodiment | dry way | 7 | twice | 500 | 2.90 |
| Third Embodiment | dry way | 5 | once | 300 | 2.93 |
| Fourth Embodiment | dry way | 5 | twice | 150 | 2.95 |
| Fifth Embodiment | wet way | 7 | once | 1000 | 2.86 |
| Sixth Embodiment | wet way | 7 | twice | 500 | 2.90 |
| Seventh Embodiment | wet way | 5 | once | 300 | 2.92 |
| Eighth Embodiment | wet way | 5 | twice | 150 | 2.97 |
| Ninth Embodiment | dry way | 5 | once | 560 | 1.52 |
| Tenth Embodiment | dry way | 10 | twice | 470 | 8.33 |
| Eleventh Embodiment | dry way | 7 | once | 180 | 15.2 |
| Twelfth Embodiment | dry way | 7 | twice | 760 | 0.61 |
| Thirteenth Embodiment | dry way | 7 | once | 270 | 35.7 |
| Fourteenth Embodiment | dry way | 7 | twice | 400 | 2.90 |
| Fifteenth Embodiment | dry way | 7 | twice | 500 | 2.88 |

In contrast with the above described embodiments, as comparative examples, cerium-based abrasives were produced by changing the production conditions (the roasting condition and the classifying condition) as follows and their coarse particle concentrations and specific surface areas were measured.

weight) were confirmed by the coarse particle concentration analysis according to the present invention.

Next, using the cerium-based abrasives produced in First to Twelfth Embodiments and comparative examples 1 to 3, a glass material was polished and the polished state was compared and evaluated. At first, the respective abrasives were dispersed in water to produce abrasive slurries of 10% by weight. The abrasive slurries were constantly being stirred to prevent the abrasives from precipitating during the polishing test by a stirring apparatus.

Using an Oscar type polishing tester (HSP-21 model, manufactured by Taito Seiki Co., Ltd.) as the tester, the polishing of the glass material was performed practically for glass for a flat panel of 60 mmφ as an object to be polished by a polishing pad made of polyurethane. The polishing conditions were as follows: each abrasive slurry was supplied at 500 ml/min; the pressure to the polished face was set to be 100 g/cm$^2$; the rotation speed of the polishing apparatus was set at 180 rpm; and the polishing duration was 3 minutes. The glass material after the polishing was washed with pure water and dried in dust-free condition.

The measurement of the polishing values in an evaluation test was carried out in the manner that the weight loss by polishing was calculated by measuring the weight of the glass before and after polishing and while the weight loss in the case of using the abrasive of the comparative example 1 was defined to be 100, the polishing values of abrasives other than the abrasive of the comparative example 1 were defined as the values relative to 100. The evaluation of the surface finishing of the polished face was done on bases of the existence of the scratches in the polished surface. Practically, the evaluation was carried out by radiating light of 300,000 lux from a halogen lamp to the surface of the glass after polishing and observing the glass surface by a reflection method. In this case, the evaluation of the scratches was carried out by giving marks based on the degree (the size) of scratches and the number of the scratches and subtracting the marks from 100, the maximum. The evaluation results were shown in Table 2.

According to the results, regarding the abrasives of First to Twelfth Embodiments, following the decrease of the coarse particle concentration, both of the number and the size of the scratches were decreased and good polished faces were confirmed. Also, regarding the polishing values, every one of the abrasives had the value approximately same as those of conventional cerium-based abrasives of comparative examples and even if the quantity of coarse particles was decreased, the polishing speed was not decreased and consequently, a high polishing efficiency was found being maintained.

On the other hand, in comparison with the comparative examples, the abrasives of the comparative examples 1, 2, 4 had relatively good polishing values but the evaluation of the polished faces was low since formation of scratches was observed. That was attributed to that the coarse particle concentration was high. Further, regarding the abrasive of the comparative example 3, in addition to a low evaluation of the polished face, the polishing value was also low. That was supposedly attributed to that the specific surface area of the abrasive particles was too low in addition to the high coarse particle concentration.

B. Relation Between the Magnetic Particle Concentration and the Polishing Property Sixteenth Embodiment A slurry was produced by mixing 10 kg of bastnasite concentrate containing: 70% by weight of TREO; and 50% by weight of cerium oxide contained in TREO with water in a proper amount as to have the slurry concentration of 1,000 g/l, and the slurry was pulverized for 4 hours with the use of a wet type pulverizer employing 3 mm-diameter zirconia pulverization medium to obtain a raw material slurry containing powders with the average particle diameter of 0.9 μm. The resulting raw material slurry was treated with

TABLE 2

| | Coarse particle concentration | Specific surface area (m$^2$/g) | Polishing value | Evaluation of polished face | |
|---|---|---|---|---|---|
| | | | | Marks | Evaluation |
| First Embodiment | 1000 ppm | 2.87 | 100 | 85 | Δ |
| Second Embodiment | 500 ppm | 2.90 | 99 | 95 | ○ |
| Third Embodiment | 300 ppm | 2.93 | 99 | 97 | ◎ |
| Fourth Embodiment | 150 ppm | 2.95 | 98 | 99 | ◎ |
| Fifth Embodiment | 1000 ppm | 2.86 | 100 | 87 | Δ |
| Sixth Embodiment | 500 ppm | 2.90 | 100 | 95 | ○ |
| Seventh Embodiment | 300 ppm | 2.92 | 99 | 98 | ◎ |
| Eighth Embodiment | 150 ppm | 2.97 | 99 | 99 | ◎ |
| Ninth Embodiment | 560 ppm | 1.52 | 117 | 91 | ○ |
| Tenth Embodiment | 470 ppm | 8.33 | 91 | 98 | ◎ |
| Eleventh Embodiment | 180 ppm | 15.2 | 75 | 98 | ◎ |
| Twelfth Embodiment | 760 ppm | 0.61 | 155 | 80 | Δ |
| Thirteenth Embodiment | 270 ppm | 35.7 | 32 | 99 | ◎ |
| Fourteenth Embodiment | 400 ppm | 2.90 | 99 | 96 | ◎ |
| Fifteenth Embodiment | 500 ppm | 2.88 | 100 | 95 | ○ |
| Comparative example 1 | 1500 ppm | 2.84 | 100 | 75 | x |
| Comparative example 2 | 1500 ppm | 0.60 | 153 | 59 | x |
| Comparative example 3 | 1800 ppm | 35.9 | 33 | 77 | x |
| Comparative example 4 | 1700 ppm | 0.29 | 195 | 10 | x |

Δ: approximately good (existence of a few of scratches)
○: good
◎: extremely good
x: existence of scratches hydrochloric acid of 1 mol/l concentration and washed with pure water and then filtered to obtain a cake. After that, the cake was dried and roasted at 850° C. for 4 hours in a stationary furnace and after pulverization by an atomizer, the resulting powder was classified to obtain a cerium-based abrasive having the average of 0.9 μm (cumulative 50% particle diameter by micro-track method D50).

Figure 4:
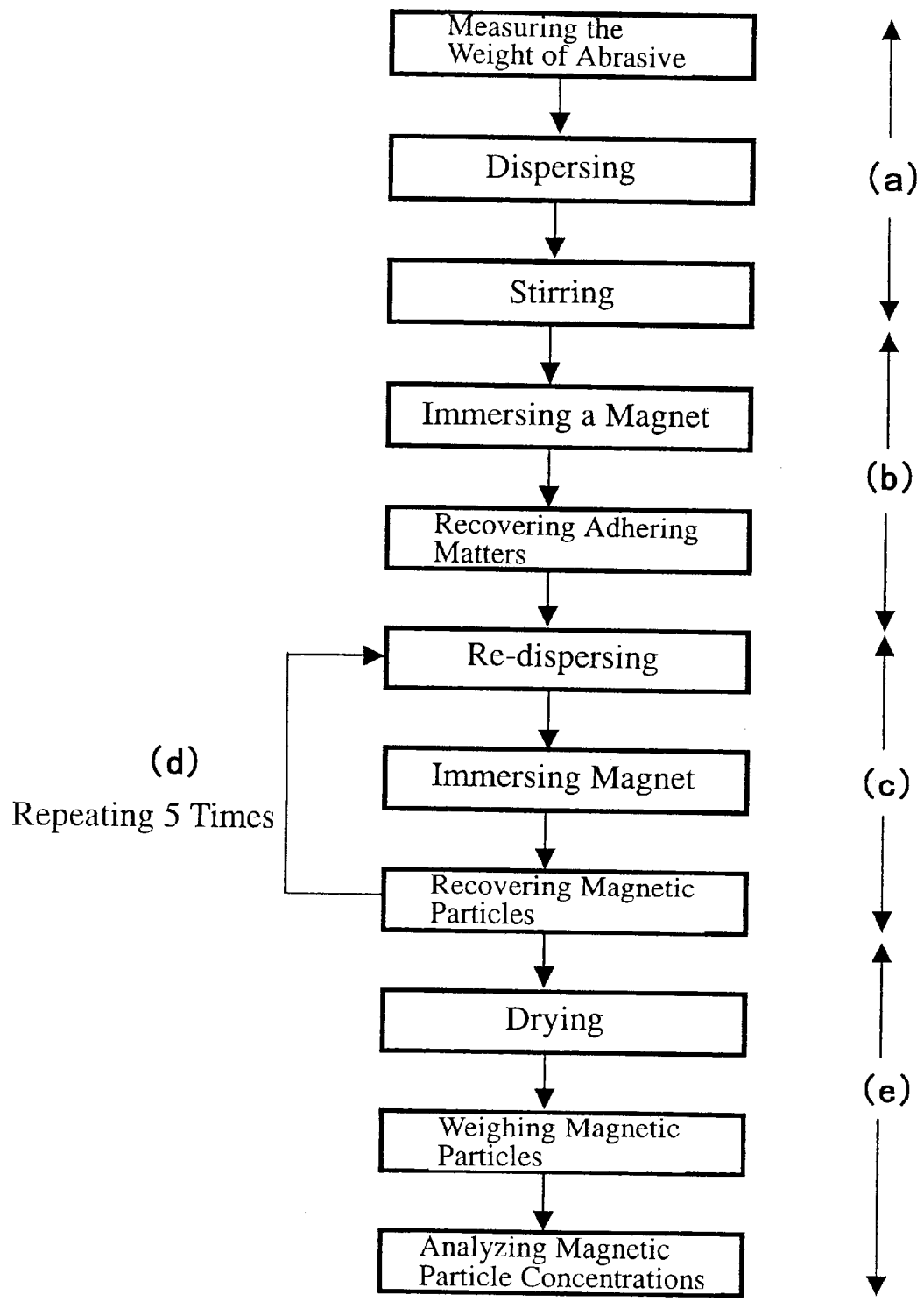

In order to measure the magnetic particle concentration of the abrasive, analysis of the magnetic particles concentration was carried out by the steps shown in FIG. 4 as one embodiment of the analysis method of the magnetic particles concentration according to the present invention.

(a) At first, 500 g of a cerium-based abrasive was measured and sampled and dispersed in 1.5 l of water and further mixed with sodium hexametaphosphate as a dispersant and stirred for 30 minutes to obtain a slurry.

(b) Next, a magnet with magnetic flux density of 2.0 T was immersed in the resulting slurry for 30 minutes. After 30 minutes, the magnet was taken out and adhering matter was recovered.

(c) Then, the recovered adhering matter was dispersed again in an aqueous sodium hexametaphosphate solution in the same manner to obtain a slurry, and a magnet with magnetic flux density of 2.0 T was immersed in the slurry for 30 minutes in the same manner.

(d) Further, the steps of repeatedly making the slurry and immersing a magnet were repeated 5 times to recover magnetic particles.

(e) The recovered magnetic particles were sufficiently dried and then weighed.

Based on the analysis results, 250 mg of magnetic particles were sampled from the cerium-based abrasive produced in this embodiment and the magnetic particles concentration was found to be 500 ppm (by weight).

Next, three types of cerium-based abrasives with different magnetic particle concentrations were produced by the operation as described below and the magnetic particle concentration was analyzed. Incidentally, the production conditions were kept same as those of First Embodiment, except the raw material compositions and the classifying conditions of such as the roasting temperature.

Figure 5:
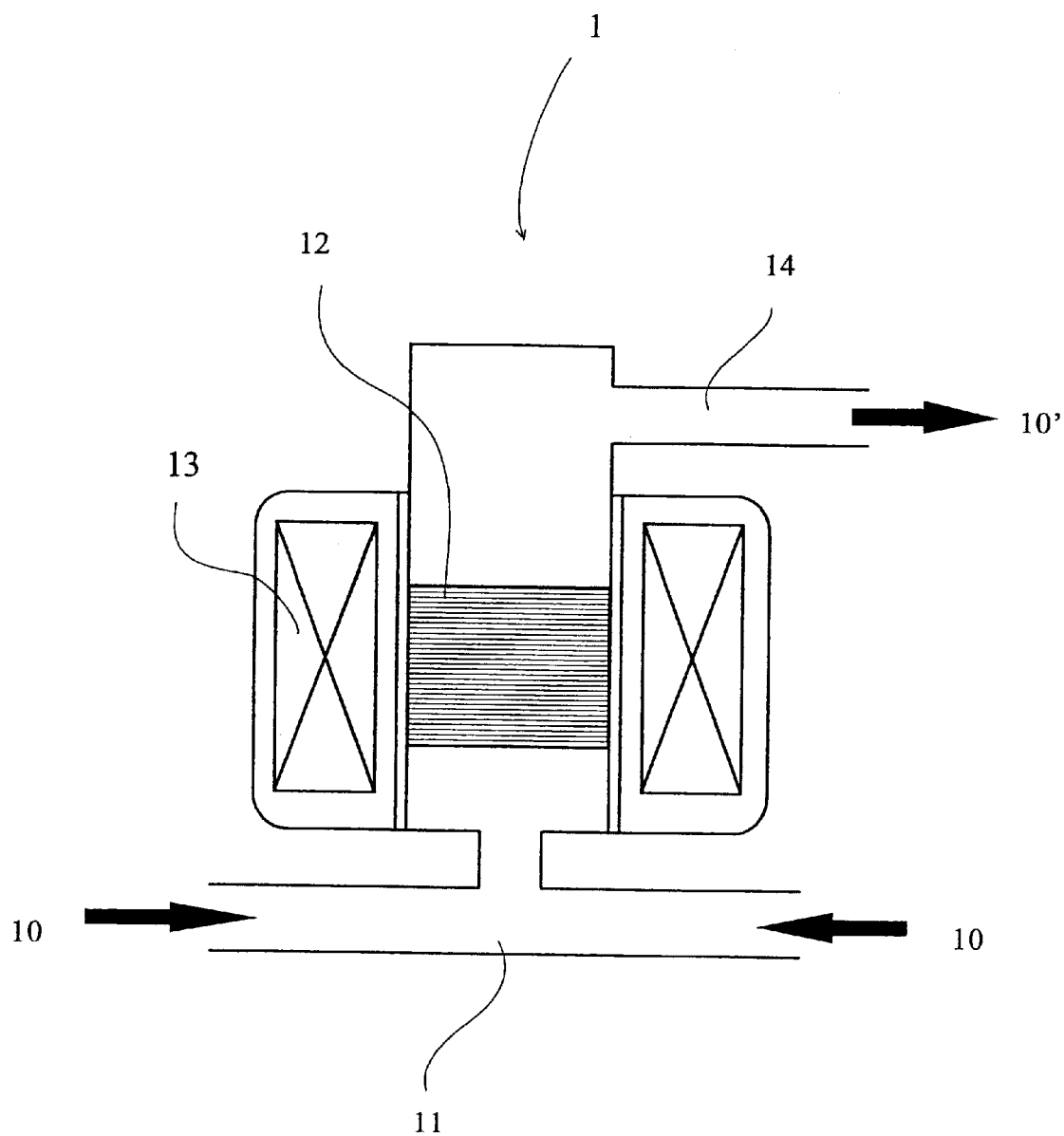
FIG. 5 is a schematic figure of the structure of a magnetic filter used for Second to Fourth Embodiments and FIG. 6 is a schematic figure of a magnet case used for Third Embodiment.

Incidentally, filtration by a magnetic filter in the steps to be illustrated hereinafter was carried out for removing magnetic particles by attaching a magnetic filter 1 as shown in FIG. 5 to the slurry pipe after pulverization. In FIG. 5, the slurry 10 after pulverization was introduced into a lower part pipe 11 of the magnetic filter 1 and the magnetic particles were removed by being filtered through the magnetized filter 12. The filter 12 was magnetized by utilizing the magnetic field generated by exciting the electromagnetic coils 14 surrounding the circumference. After that, a slurry 10' from which magnetic particles were removed was discharged out through an upper part pipe 13 and was to be sent to the steps thereafter.

Figure 6:
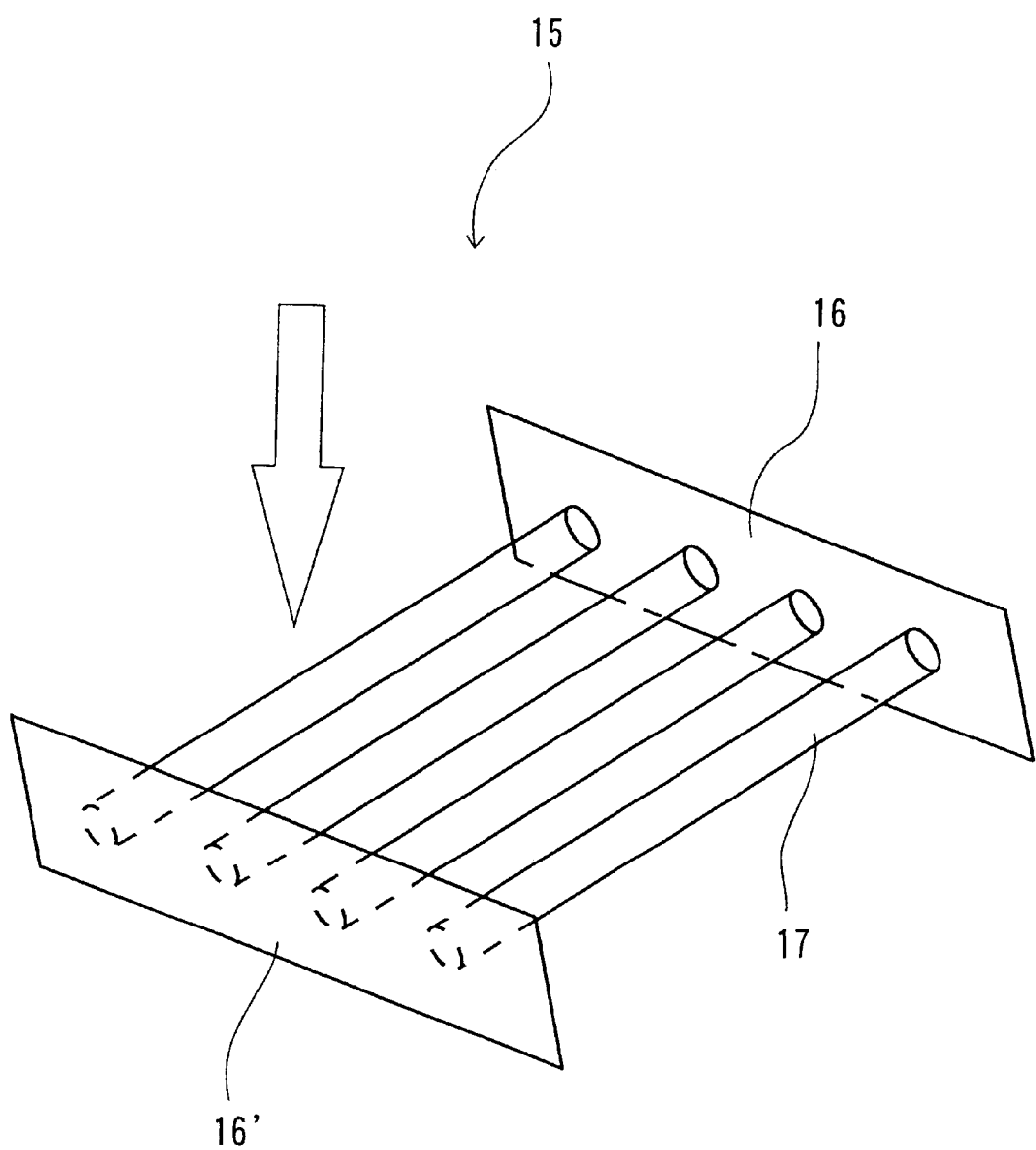

Further, FIG. 6 was a schematic illustration of a magnet case 15. The magnet case 15 comprised a plurality of rod magnets 17 between two metal plates 16, 16' and was employed to remove magnetic particles in an abrasive raw material by passing the abrasive through rod magnets after roasting and pulverization steps.

Seventeenth Embodiment

The raw material slurry produced by the same method as that of Sixteenth Embodiment was pulverized using a pulverization medium made of a wear resistant steel with the diameter of 3 mm and the slurry after pulverization was passed through a magnetic filter (magnetic flux density 0.65 T and pore diameter 3 mm). After that, in the same steps as those of First Embodiment, roasting, pulverizing, and classifying treatment was carried out to produce a cerium-based abrasive.

Eighteenth Embodiment

The raw material slurry produced by the same method as that of Sixteenth Embodiment was pulverized using a pulverization medium made of a wear resistant steel with the diameter of 3 mm and the slurry after pulverization was passed through a magnetic filter same as that of Second Embodiment. After that, in the same steps as those of First Embodiment, after roasting and pulverizing treatment, the powder was passed through a magnet case and then classified to produce a cerium-based abrasive.

Nineteenth Embodiment

In this embodiment, an abrasive was produced by using a rare earth oxide as the abrasive raw material in place of the bastnasite concentrate and adding a fluorine component by carrying out ammonium fluoride treatment. A slurry containing 2 kg of the rare earth oxide containing 99% by weight of TREO which was produced by roasting rare earth carbonates, the TREO containing 60% by weight of cerium oxide, was mixed with 2 l of water. The resultant slurry was pulverized for 5 hours with the use of a wet type ball mill pulverizer (the capacity 5 l) filled with 12 kg of 5 mm-diameter pulverization medium made of a steel with and the resulting slurry after pulverization was passed through the magnetic filter. Then, the resulting slurry was mixed with an ammonium fluoride solution in 1 mol/l concentration and washed with pure water and filtered to obtain a cake. After that, the cake was dried and then roasted at 850° C. for 4 hours in a stationary furnace and after pulverization by an atomizer, the resulting powder was classified to obtain a cerium-based abrasive having the average of 0.9 μm (cumulative 50% particle diameter by micro-track method D50).

The cerium-based abrasives produced in these Sixteenth to Nineteenth Embodiments were found having the magnetic particle concentration within a range from 150 to 1,000 ppm (by weight) by the same analysis method of the magnetic particle concentration as First Embodiment.

Comparative Example 5

In contrast with the above described Sixteenth to Nineteenth Embodiments, a cerium-based abrasive was produced by a conventional production method. That is, an abrasive was produced using a wear resistant steel as a pulverization medium material for the slurry pulverization without a step of passing through either a magnetic filter or a magnetic case. After that, the magnetic particle concentration was analyzed by the same method as the above described embodiments.

Consequently, it was found that the cerium-based abrasive according to the comparative example contained the magnetic particles in 2,000 ppm (by weight) magnetic particle concentration.

Using the cerium-based abrasives produced by the above described Sixteenth to Nineteenth Embodiments and the comparative example 5 were used for polishing glass materials and the polished state was comparatively evaluated. The method for the polishing test as same as those carried out in First to Fifteenth Embodiments. The evaluation results were shown in Table 3.

TABLE 3

|  | Magnetic particle concentration | Specific surface area (m²/g) | Polishing value | Evaluation of polished face | |
| --- | --- | --- | --- | --- | --- |
|  |  |  |  | Marks | Evaluation |
| Sixteenth Embodiment | 500 ppm | 5.10 | 100 | 95 | ○ |
| Seventeenth Embodiment | 1000 ppm | 5.02 | 100 | 85 | Δ |
| Eighteenth Embodiment | 300 ppm | 5.14 | 100 | 98 | ⊚ |
| Nineteenth Embodiment | 150 ppm | 5.20 | 100 | 98 | ⊚ |
| Comparative example 5 | 2000 ppm | 4.99 | 100 | 75 | x |

⊚: extremely good
○: good
Δ: approximately good (existence of a few of scratches)
x: existence of scratches According to the results, regarding the abrasives of Sixteenth to Nineteenth Embodiments, in comparison with the comparative example 5, following the decrease of the magnetic particle concentration, both of the number and the size of the scratches were decreased and good polished faces were confirmed. Also, regarding the polishing values, every one of the abrasives had the value approximately same as those of conventional cerium-based abrasives of comparative examples and even if the quantity of magnetic particles was decreased, the polishing speed was not decreased and consequently, a high polishing efficiency was found being maintained.

Industrial Applicability

A cerium-based abrasive according to the present application in which the coarse particle concentration and the magnetic particle concentration are decreased is capable of forming a polished face with high precision and free of scratch formation. Especially, the cerium-based abrasive is usable even for forming a polished face of a recording medium such as a hard disk and the like and a substrate of a LCD and the like for which high density and high precision are further required in the future.

Further, the cerium-based abrasive is excellent in the polishing value by controlling the specific surface area of the abrasive particles to be within a specified range and, consequently, is more effective to form a polished face at a high polished value and high precision, which is the intrinsic property of the cerium-based abrasive. Such a cerium-based abrasive can be produced without requiring considerable alteration of a conventional production method.

What is claimed is:

1. A cerium oxide abrasive containing cerium oxide as a main component and having an average particle diameter of 0.2 to 3.0 μm, wherein any magnetic particles in the cerium oxide abrasive are in a concentration of no more than 1,000 ppm (by weight).

2. The cerium oxide abrasive according to claim 1, wherein the concentration of the magnetic particles is 300 ppm (by weight).

3. A cerium oxide abrasive according to claim 1, wherein any course particles with a particle diameter of 10 μm or larger in the cerium oxide abrasive are in a concentration of no more than 1,000 ppm (by weight).

4. The cerium oxide abrasive according to claim 1, wherein any coarse particles with a particle diameter of 10 μm or larger in the cerium oxide abrasive are in a concentration of no more than 300 ppm (by weight).

5. The cerium oxide abrasive according to claim 1, wherein an abrasive particles have an average value of specific area of 0.5 to 30 m²/g.

6. A production method for a cerium oxide abrasive, comprising the steps of (a) producing a slurry by mixing an abrasive raw material and a dispersion medium;

(b) wet-pulverizing the abrasive raw material by treating the slurry with a wet pulverizer;

(c) filtering and drying the wet pulverized abrasive raw material;

(d) roasting the dried abrasive raw material;

(e) dry-pulverizing the roasted abrasive raw material; and (f) carrying out classification treatment for the dry-pulverized abrasive raw material wherein the method further comprises a step of removing magnetic material that may by present by passing the slurry treated by the wet pulverization of step (b) through a filter made of a magnetic material magnetized by excitation.

7. The method according to claim 6, wherein the method further comprises a step of at least once repeating the classification treatment of step (f).

8. The method according to claim 6, wherein the filter made of the magnetic material is magnetized in a magnetic flux density range of 0.1 to 2.0 T.

9. A production method for producing a cerium oxide abrasive, comprising the steps of:

(a) producing a slurry by mixing an abrasive raw material and a dispersion medium; (b) wet-pulverizing the abrasive raw material by treating the slurry with a wet pulverizer; (c) filtering and drying the wet pulverized abrasive raw material; (d) roasting the dried abrasive raw material; (e) dry-pulverizing the roasted abrasive raw material; and (f) carrying out classification treatment for the dry-pulverized abrasive raw material, wherein the abrasive raw material is wet pulverized in step (b) in a wet pulverizer using a pulverization medium made of a non-magnetic material.

10. The production according to claim 9, wherein zirconia or alumina is used as the non-magnetic material constituting the pulverization medium.

11. A production method for producing a cerium oxide abrasive, comprising the steps of:

(a) producing a slurry by mixing an abrasive raw material and a dispersion medium;

(b) wet-pulverizing the abrasive raw material by treating the slurry with a wet pulverizer;

(c) filtering and drying the wet pulverized abrasive raw material;

(d) roasting the dried abrasive raw material;

(e) dry-pulverizing the roasted abrasive raw material; and (f) carrying out classification treatment for the dry-pulverized abrasive raw material, wherein the method further comprises a step of passing the abrasive raw material roasted by the step (d) through or nearby a magnetized material body.

12. The method according to claim 11, wherein the body is magnetized in a magnetic flux density within a range from 0.1 to 2.0 T.

13. The cerium oxide abrasive according to claim 3, wherein the abrasive particles have an average value of specific surface area of 0.5 to 30 m$^2$/g.

14. The method according to claim 6, wherein the classification treatment of step (f) is carried out by controlling a classification point in a range from 0.5 to 15 μm.

15. The method according to claim 9, wherein the classification treatment of step (f) is carried out by controlling a classification point in a range from 0.5 to 15 μm.

16. The method according to claim 9, wherein the method further comprises a step of at least once repeating the classifying treatment of step (f).

17. The method according to claim 11, wherein the magnetized material body is a tubular body, a plate-shaped, or a rod-shaped body.

18. The method according to claim 11, wherein the classification treatment of step (f) is carried out by controlling a classification point in a range from 0.5 to 15 μm.

19. The method according to claim 11, wherein the method further comprises a step of at least once repeating the classification treatment of step (f).

* * * * *